United States Patent
Nishijima et al.

(10) Patent No.: US 12,516,949 B2
(45) Date of Patent: Jan. 6, 2026

(54) INFORMATION PROCESSING APPARATUS, METHOD

(71) Applicant: TOYOTA JIDOSHA KABUSHIKI KAISHA, Toyota Aichi-ken (JP)

(72) Inventors: Toshifumi Nishijima, Kasugai Aichi-ken (JP); Hiroki Awano, Nerima-ku Tokyo-to (JP); Daiki Kubo, Toshima-ku Tokyo-to (JP); Natsumi Koike, Shinagawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/123,414

(22) Filed: Mar. 20, 2023

(65) Prior Publication Data

US 2023/0304819 A1 Sep. 28, 2023

(30) Foreign Application Priority Data

Mar. 22, 2022 (JP) .................................. 2022-045860

(51) Int. Cl.
| | |
|---|---|
| G06F 16/00 | (2019.01) |
| G01C 21/36 | (2006.01) |
| G06F 16/2457 | (2019.01) |
| G06F 16/29 | (2019.01) |

(52) U.S. Cl.
CPC ..... *G01C 21/3617* (2013.01); *G01C 21/3608* (2013.01); *G01C 21/362* (2013.01); *G01C 21/3679* (2013.01); *G06F 16/24575* (2019.01); *G06F 16/29* (2019.01)

(58) Field of Classification Search
CPC .. G06F 16/24575; G06F 16/29; G06F 16/909; G06F 16/9038
See application file for complete search history.

(56) References Cited

U.S. PATENT DOCUMENTS

| | | | | |
|---|---|---|---|---|
| 6,760,770 | B1 * | 7/2004 | Kageyama | .............. H04L 67/52 |
| | | | | 709/225 |
| 8,217,777 | B2 * | 7/2012 | Sekiyama | .............. G08G 1/127 |
| | | | | 340/459 |
| 10,430,471 | B2 * | 10/2019 | Inoue | ............... G08G 1/096811 |

(Continued)

FOREIGN PATENT DOCUMENTS

| | | |
|---|---|---|
| JP | 2001-330450 A | 11/2001 |
| JP | 2012-068041 A | 4/2012 |
| WO | 2019/117048 A1 | 6/2019 |

*Primary Examiner* — Noosha Arjomandi
(74) *Attorney, Agent, or Firm* — Dinsmore & Shohl LLP

(57) ABSTRACT

An information processing apparatus determines, when detecting an instruction from a user to search for a facility, whether position information of the user indicates that the user is in a first area where visit frequency of the user is higher than a predetermined threshold. The information processing apparatus detects, when the position information of the user indicates that the user is in a first area, a new facility by searching within a predetermined range based on the position information, and outputs the information about the detected new facility to a predetermined device. The information processing apparatus records, as the first area, an area where a visit frequency indicated by movement history information indicating movement history of the user is equal to or greater than a predetermined threshold.

14 Claims, 7 Drawing Sheets

(56) References Cited

U.S. PATENT DOCUMENTS

| | | | |
|---|---|---|---|
| 10,838,954 B1* | 11/2020 | Santos | G10L 15/22 |
| 2011/0137907 A1* | 6/2011 | Ikenoue | G06F 16/29 |
| | | | 707/E17.089 |
| 2013/0275432 A1* | 10/2013 | Bandara | G06Q 30/0282 |
| | | | 707/739 |
| 2014/0005940 A1* | 1/2014 | Suzuki | G01C 21/3484 |
| | | | 701/527 |
| 2015/0300837 A1* | 10/2015 | Hisano | G08G 1/096811 |
| | | | 701/454 |
| 2016/0148429 A1* | 5/2016 | Groppa | G09G 5/026 |
| | | | 345/419 |
| 2018/0143998 A1* | 5/2018 | Prahladka | G01C 21/3682 |
| 2018/0158369 A1* | 6/2018 | Al Darwesh | G09B 21/007 |
| 2018/0299272 A1* | 10/2018 | Salowitz | H04W 4/021 |
| 2019/0094037 A1* | 3/2019 | Jin | G01C 21/3602 |
| 2019/0235251 A1* | 8/2019 | Amano | G08G 1/202 |
| 2019/0313210 A1* | 10/2019 | Ohkawa | G06F 16/29 |
| 2020/0326201 A1* | 10/2020 | Nara | G06F 3/147 |
| 2021/0180973 A1* | 6/2021 | Jin | G01C 21/3697 |
| 2022/0130054 A1* | 4/2022 | Okano | G06T 7/246 |
| 2022/0417718 A1* | 12/2022 | Yoshida | B60R 16/023 |
| 2023/0304819 A1* | 9/2023 | Nishijima | G01C 21/362 |

* cited by examiner

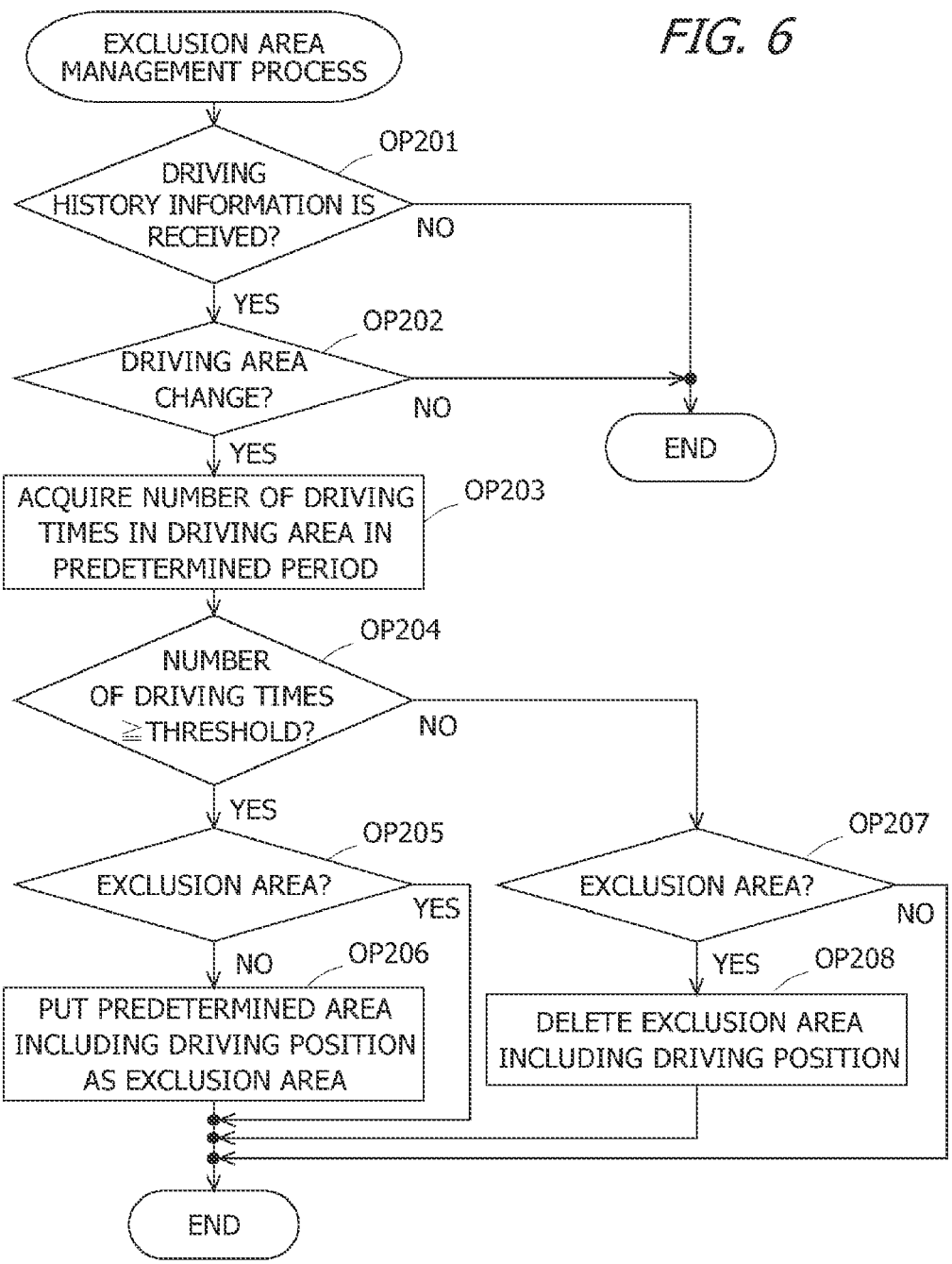

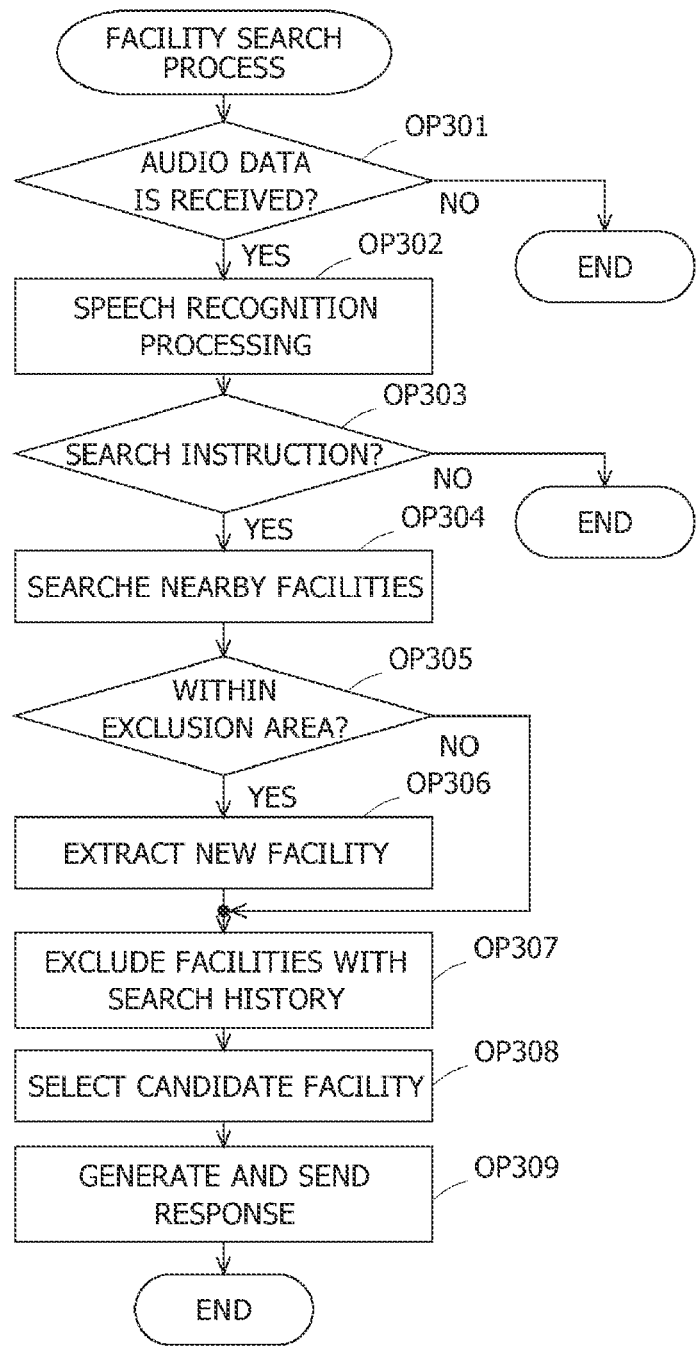

INFORMATION PROCESSING APPARATUS, METHOD

CROSS REFERENCE TO RELATED APPLICATION

This application claims the benefit of Japanese Patent Application No. 2022-045860, filed on Mar. 22, 2022, which is hereby incorporated by reference herein in its entirety.

BACKGROUND

Technical Field

The present disclosure relates to an information processing apparatus and method.

Description of the Related Art

A navigation device is disclosed that includes a camera that monitors the landscape ahead, a camera that monitors the driver's gaze, and a building details information database, and that displays, on the display, when the driver asks a question such as "What is that?," detailed information about the building the driver is looking at (for example, Patent Document 1).

CITATION LIST

Patent Document

[Patent Document 1] Japanese Patent Laid-Open No. 2001-330450

A subject of one of aspects of the disclosure is to provide an information processing apparatus and an information processing method that can accurately identify a search target.

SUMMARY

One aspect of the present disclosure is an information processing apparatus comprising
a processor is configured to:
detect, when position information of a user indicates that the user is in a first area where visit frequency of the user is higher than a predetermined threshold, a new facility by searching within a predetermined range based on the position information; and
output the information about the new facility to a predetermined device.

Another aspect of the present disclosure is a method executed by a computer comprising:
detecting, when position information of a user indicates that the user is in a first area where visit frequency of the user is higher than a predetermined threshold, a new facility by searching within a predetermined range based on the position information; and
outputting the information about the new facility to a predetermined device.

Another aspect of the present disclosure is an information processing apparatus comprising
a processor is configured to:
acquire position information;
receive information about a new facility from a server, the new facility detected as a result of searching within a predetermined range based on the position information when the position information indicates that the information processing apparatus is in a first area where visit frequency is higher than a predetermined threshold; and
output the information about the new facility.

According to one aspect of the present disclosure, the object of the search can be accurately determined.

BRIEF DESCRIPTION OF DRAWINGS

FIG. 6 is an example of a flow chart of exclusion area management process executed by the server; and FIG. 7 is an example of a flow chart of a facility search process executed by the server.

DESCRIPTION OF THE EMBODIMENTS

Figure 1:
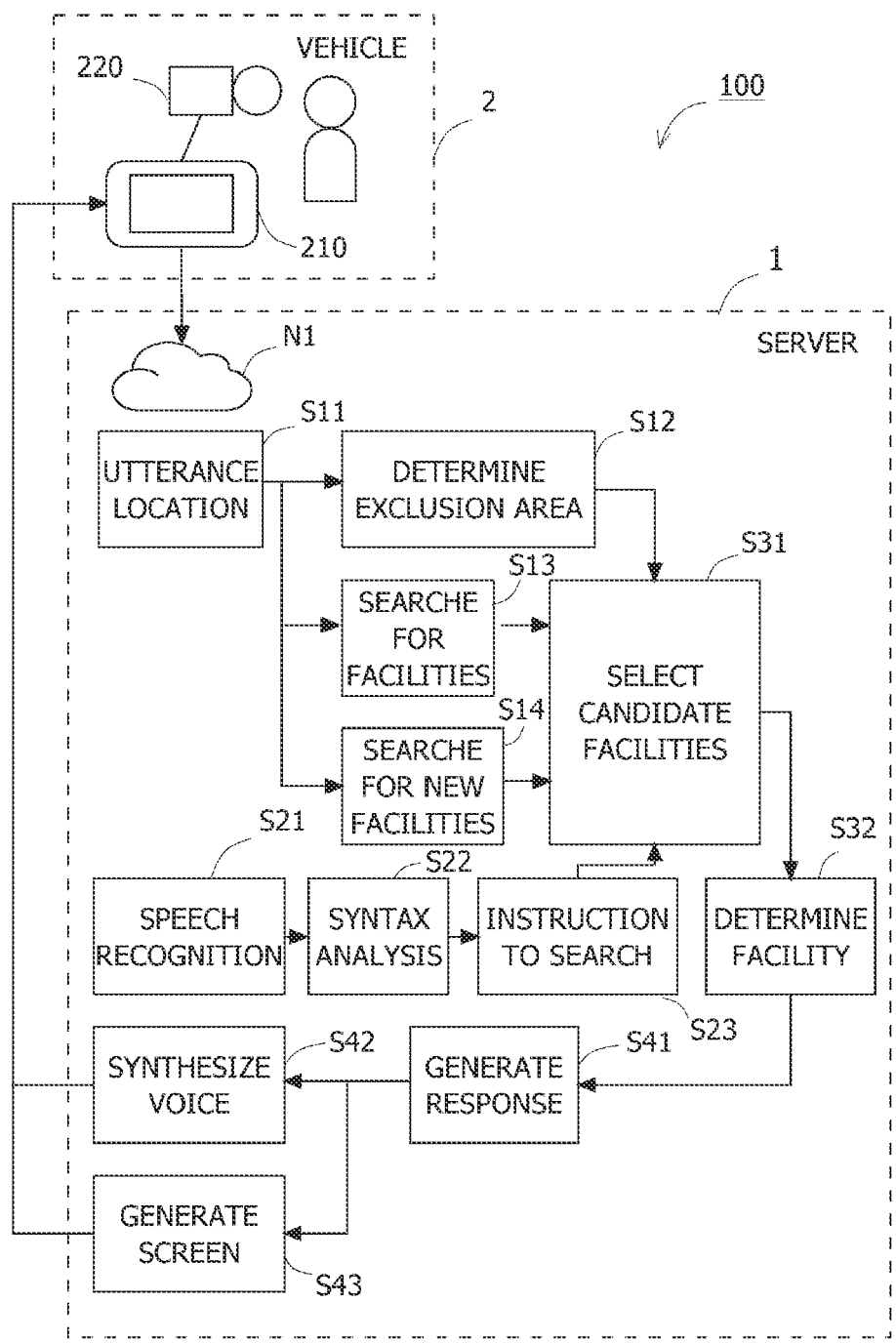
FIG. 1 is a diagram illustrating an example of a system configuration of a facility search system according to the first embodiment and processing performed in the facility search system.

For example, when an occupant of the vehicle asks, "What is that?" while the vehicle is moving, it is likely that the occupant is seeing the object for the first time. For example, in the vicinity of the driver's home and in areas he frequently visits, facilities that driver sees for the first time are likely to be ones recently build. Therefore, in one aspect of the present disclosure, the accuracy of the search for facilities is improved by searching for recently built facilities in areas where the vehicle frequently travels.

Specifically, one aspect of the present disclosure is an information processing device including a processor. The processor may detect, when position information of a user indicates that the user is in a first area where visit frequency of the user is higher than a predetermined threshold, a new facility by searching within a predetermined range based on the position information, and output the information about the new facility to a predetermined device.

The information processing device may be, for example, a server, an in-vehicle device, a smartphone, a tablet terminal, a wearable terminal, PC (personal computers) and the like. The processor may be a CPU (Central Processing Unit). The predetermined range based on position information of the user may or has not to include, for example, the position of the user. The predetermined range based on the position information of the user may be, for example, a range within a predetermined distance from the position of the user, a range within a predetermined distance from a point that is a predetermined distance away from the position of the user, and the like. Facilities may include, for example, buildings, stores, hospitals, schools, art galleries, museums, parks, shrines, temples, amusement parks, public facilities, and the like. The new facility may be a facility that is newly build, opened, or commenced operations within the most recent predetermined period. The predetermined device to which the information about the new facility acquired as a result of the search is output are, for example, a display, a speaker, another device, and the like.

The first area may be an area where the visit frequency of the user is higher than the predetermined threshold, that is, an area the user frequently visits. According to one aspect of the present disclosure, when there is the user in the first area, the information about the new facility is output. Therefore, the possibility of hitting what the user is searching for when the user is in the first area is improved. In short, the accuracy of the search is improved.

In the one aspect of the present disclosure, the processor may detect, when the position information indicates that the user is outside the first area, facilities including the new facility and a facility other than the new facility by searching within the predetermined range based on the position information, and output information regarding detected facility to the predetermined device. As a result, when there is the user in an area other than the first area, all facilities within the predetermined range can be searched.

In the one aspect of the present disclosure, the information processing device may further include a storage that holds search history information indicating history of a search for a facility by the user. In this case, the processor may exclude facilities indicated by the search history information from a plurality of new facilities detected as a result of the searching. The user is likely to already know about facilities that have search histories, and the user is not likely to want information about the facilities. Therefore, by excluding facilities with search history from the plurality of new facilities acquired as a result of search, it is possible to suppress presentation of information about facilities that users do not want. The possibility of hitting what the user is searching for can be improved more.

In the one aspect of the present disclosure, the processor may determine, when detecting an instruction from the user to search for a facility, whether the position information indicates that the user is in the first area. Therefore, it is possible to limit the execution of the search of the facility to when the instruction from the user is detected, and the processing load of the information processing device can be reduced.

The processor may acquire audio data of utterance by the user, and detect, by analyzing the audio data, the instruction from the user to search for a facility. This allows the user to search for facilities by voice. Furthermore, when the information processing device is a server, the processor may receive the audio data of the utterance by the user and the position information from a user terminal of the user.

In the one aspect of the present disclosure, the processor may acquire movement history information indicating movement history of the user, and record, as the first area, an area where a visit frequency indicated by the movement history information of the user is equal or greater than a predetermined threshold. The movement history information of the user may include, for example, at least position information and time information. This allows an area to be recorded as the first area based on the user's movement history.

The processor may monitor the movement history information of the user, add, to the first area, areas where visit frequency in most recent predetermined period has changed to equal to or greater than the predetermined threshold, and remove, from the first area, areas where the visit frequency in the most recent predetermined period has changed to less than the predetermined threshold. This allows the first area to be updated based on the movement history information of the user, and the first area can be flexibly adapted to changes in user behavior.

The processor may record, as the first area, the area including home of the user and an urban area around the home of the user. The area including the home of the user and the urban area around it are areas that it is clear for the user to visit frequently. Therefore, by recording as the first area in advance for the areas that it is clear for the user to visit frequently, it is possible to search for facilities with high accuracy, even if, for example, the movement history information of the user is not sufficiently obtained.

Another aspect of the present disclosure may also be identified as a method for a computer to execute the processes of the above information processing apparatus. This method is a method executed by the computer including detecting, when position information of a user indicates that the user is in the first area where visit frequency of the user is higher than a predetermined threshold, a new facility by searching within a predetermined range based on the position information, and outputting the information about the new facility to a predetermined device. Another aspect of the present disclosure may also be identified as a program for causing a computer to execute the operations of the information processing apparatus described above. Another aspect of the present disclosure may also be identified as a computer-readable non-transitory recording medium recorded with the program.

Another aspect of the present disclosure is an information processing apparatus including a processor may acquire position information, receive information about a new facility from a server, the new facility detected as a result of searching within a predetermined range based on the position information when the position information indicates that the information processing apparatus is in the first area where visit frequency is higher than a predetermined threshold, and output the information about the new facility. The information processing apparatus is, for example, a terminal such as a smartphone, a tablet terminal, an in-vehicle device, and the like. According to one aspect of the present disclosure, the information processing apparatus, when in the first area, can acquire a search result from the server that is likely to hit an object the user searches for.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of a system configuration of a facility search system 100 according to the first embodiment and processing performed in the facility search system 100. The facility search system 100 is a system that searches, based on a user's voice instructing to search for a facility, for a target facility and presents information on the target facility. The facilities to be searched are, for example, buildings, stores, hospitals, schools, art galleries, museums, parks, shrines, temples, amusement parks, public facilities, and the like. However, the facilities to be searched are not limited to these.

The facility search system 100 includes a server 1 and a vehicle 2. The facility search system 100 includes a plurality of vehicles 2, but for convenience, only one vehicle 2 is illustrated in FIG. 1.

The vehicle 2 includes, for example, an in-vehicle device 210 and a microphone 220. the server 1 and the in-vehicle device 210 are connected to a network N1 and can communicate through the network N1. The network N1 is a public communication network such as the Internet, for example.

For example, if a user in the vehicle 2 looks around and wants to know about a predetermined facility, the user asks a question such as "What is that?" the microphone 220 receives the utterance voice, and the in-vehicle device 210 acquires audio data of the utterance voice. The in-vehicle device 210 transmits the audio data of the utterance voice and the position information to the server 1 through N1.

When the server 1 receives the audio data and position information from the in-vehicle device 210, the server 1 performs the processing from S11 to S43. In S11, the server 1 identifies the position indicated by the received position information as the utterance location. In S12, the server 1 determines whether the utterance location is within an exclusion area. The exclusion area is an area where visit frequency of a user associated with the vehicle 2 is equal to or greater than a predetermined threshold, that is, an area where the vehicle 2 frequently travels. The user associated with the vehicle 2 is the user registered in advance with the facility search system 100 in association with the vehicle 2. More specifically, the user associated with the vehicle 2 is the owner of the vehicle 2, the driver of the vehicle 2, or the like. Note that the users in the vehicle 2 may include the users assigned to the vehicle 2 and the users riding in the vehicle 2. From now on, if it is simply written as the user of the vehicle 2, it indicates the user in the vehicle 2.

In S13, the server 1 searches for facilities within a predetermined range based on the utterance location. In S14, the server 1 searches for new facilities among the facilities within the predetermined range based on the utterance location. New facilities are facilities that are newly constructed, opened, or commenced operations within the most recent predetermined period. New facilities may also include facilities that are under construction or scheduled to open. The period of time where facilities are considered to be new facilities is arbitrarily set, for example, ranging from the most recent month to one year.

In S21, server 1 performs speech recognition processing on the received audio data and acquires an utterance content. In S22, the server 1 performs a syntax analysis on the utterance content acquired by processing in S21. In S23, the server 1 determines whether the utterance content indicates an instruction to search a facility as a result of the syntax analysis in S22.

In S31, the server 1 selects facilities which are candidates for a search target when the utterance content is an instruction to search for a facility as determined in S23. At this time, when the utterance location is within the exclusion area as a result of the determination in S12, the server 1 selects the new facilities in the vicinity as the candidates for the search target acquired as the result of the search in S14. On the other hand, when the utterance location is outside the exclusion area as the result of the determination in S12, the server 1 selects the nearby facilities acquired as the result from the search in S13 as the candidates for the search target. In S32, the server 1 determines a facility to be presented to the user of the vehicle 2 from among the facilities selected as the candidates for the search target in S31.

In S41, the server 1 acquires information about the facility to be presented to the user and generates a response to the facility search instruction. In S42, the server 1 synthesizes voice corresponding to the response to the facility search instruction and transmits the audio data to the in-vehicle device 210. In S43, the server 1 generates a screen corresponding to the response to the facility search instruction and transmits the image data to the in-vehicle device 210. Note that only one of S42 or S43 may be performed.

In the first embodiment, the area frequently visited by the user of the vehicle 2 is set as an exclusion area, and when the utterance location is within the exclusion area, a new facility is selected as a candidate for the search target. For an area that the user frequently visits, it's likely that the user already knows about the facilities in or around the area. Therefore, when an utterance indicating a facility search instruction is made in an area that the user frequently visits, it is likely that the facility to be the search target is a facility that the user of the vehicle 2 does not know. A facility that the user does not know about in an area that the user frequently visits is likely to be a facility that is built recently. Therefore, according to the first embodiment, when a facility search instruction is happened in an area that the user frequently visits, selecting a new facility in the vicinity can improve the hit rate of the facility that the user is searching for.

Figure 2:
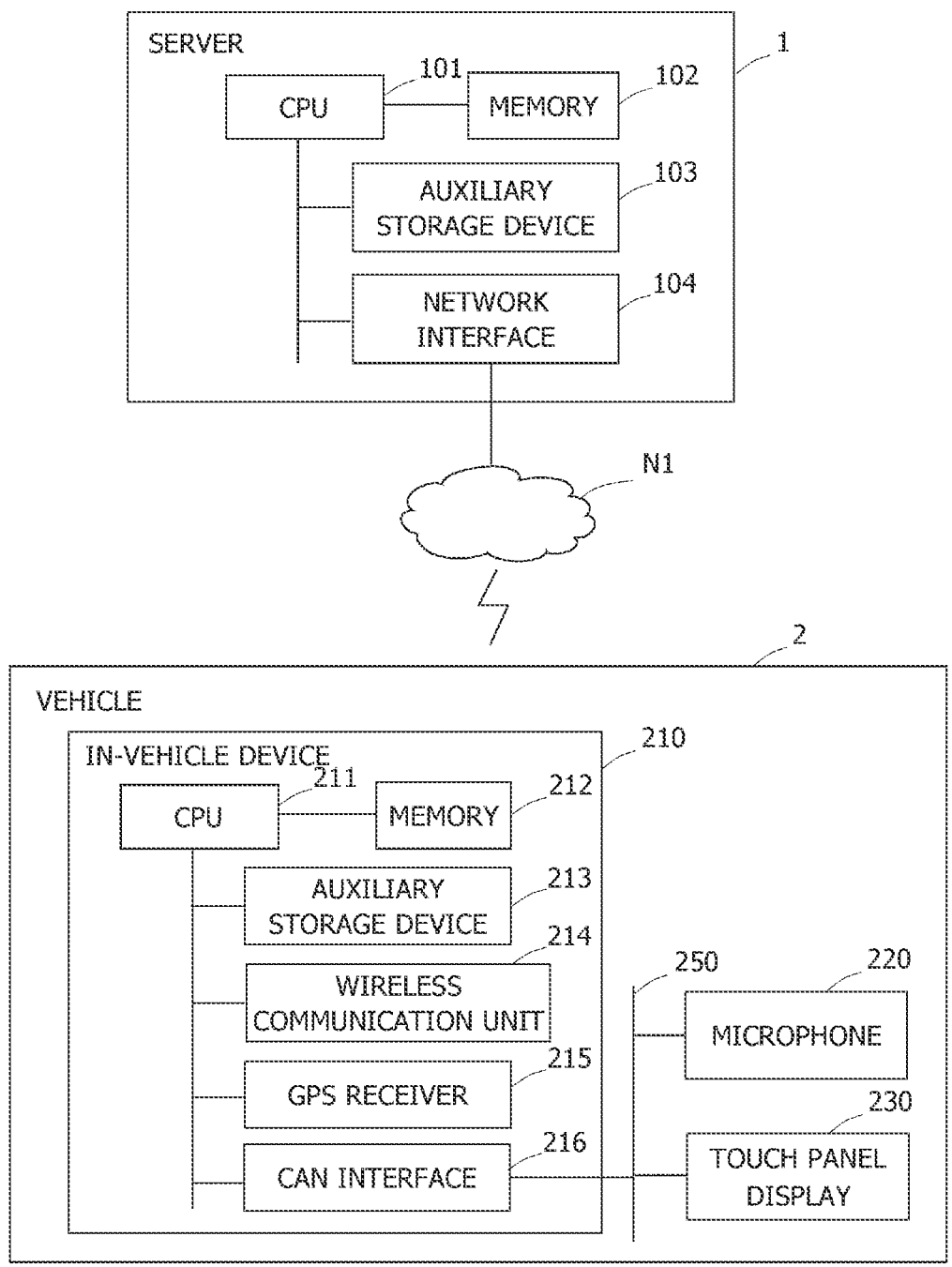
FIG. 2 is an example of the hardware configuration of a server and a vehicle.

FIG. 2 is an example of the hardware configuration of the server 1 and the vehicle 2. However, in FIG. 2, for the vehicle 2, only the hardware components related to the processing of the facility search system 100 are extracted and illustrated. The server 1 is a computer that operates as a server, for example. The server 1 includes a CPU 101, a memory 102, an auxiliary storage device 103, and a network interface 104 as a hardware configuration. The memory 102 and the auxiliary storage device 103 are examples of computer-readable recording media, respectively.

The auxiliary storage device 103 stores various programs and the data used by the CPU 101 when executing each program. The auxiliary storage device 103 is, for example, a HDD (Hard Disk Drive), SSD (Solid State Drive), a flash memory, and the like. The programs stored in the auxiliary storage device 103 include, for example, an OS (Operation System), a speech recognition program, a control program for the facility search system 100, and the like. The control program of the facility search system 100 is a program for identifying the facility to be a search target of the user of the vehicle 2 and providing information about the identified facility.

The memory 102 is a main memory that provides the CPU 101 with a memory area and a work area to load a program stored in the auxiliary storage device 103, and is used as a buffer. The memory 102 includes, for example, a semiconductor memory such as ROM (Read Only Memory) and RAM (Random Access Memory).

The CPU 101 executes various processes by loading and executing the OS and various other programs held in the auxiliary storage device 103 into the memory 102. The CPU 101 is not limited to one, and may be provided in multiple. The CPU 101 is an example of a "processor."

The network interface 104 is an interface connected to the network N1. The network interface 104 is, for example, an interface for a wired network such as a LAN (Local Area Network) and a private line. Alternatively, the network interface 104 may be a wireless communication circuit as an interface to a wireless network.

Next, the vehicle 2 includes the in-vehicle device 210, the microphone 220, and a touch panel display 230 as hardware configurations. The in-vehicle device 210, the microphone 220, and the touch panel display 230 are connected to a CAN (Controller Area Network) network 250, for example.

The in-vehicle device 210 is, for example, a multimedia ECU of a car navigation system. However, not limited to this, a DCM (Data Communication Module) may be used instead of the ECU 1. The in-vehicle device 210 includes, for example, a CPU 211, a memory 212, an auxiliary storage device 213, a wireless communication unit 214, a GPS receiver 215, and a CAN interface 216. The CPU 211, the memory 212, and the auxiliary storage device 213 are the same as the CPU 101, the memory 102, and the auxiliary storage device 103. However, the auxiliary storage device 213 stores an OS, a client program of the facility search system 100, and a plurality of other application programs.

The wireless communication unit 214 is a wireless communication circuit in accordance with a cellular communication system such as 5G (5th Generation), 6G, 4G, and LTE (Long Term Evolution), WiMAX, and a wireless communication system such as WiFi, for example. The wireless communication unit 214 is connected to an access network by wireless communication, and is connected to the network N1 through the access network to enable communication with an external device such as the server 1.

The GPS receiver 215 receives a signal from the GPS satellite and determines position information indicating the current position based on the received signal. The position information acquired by the GPS receiver 215 is, for example, latitude and longitude. The GPS receiver 215 acquires position information at predetermined intervals and outputs it to the CPU 211.

The CAN interface 216 is an interface to the CAN network 250. The CAN interface 216 outputs data inputted from the CPU 211 to the CAN network 250. The hardware configuration of the server 1 and the vehicle 2 illustrated in FIG. 2 is an example, and the hardware configuration of server 1 and vehicle 2 is not limited to the example illustrated in FIG. 2.

Figure 3:
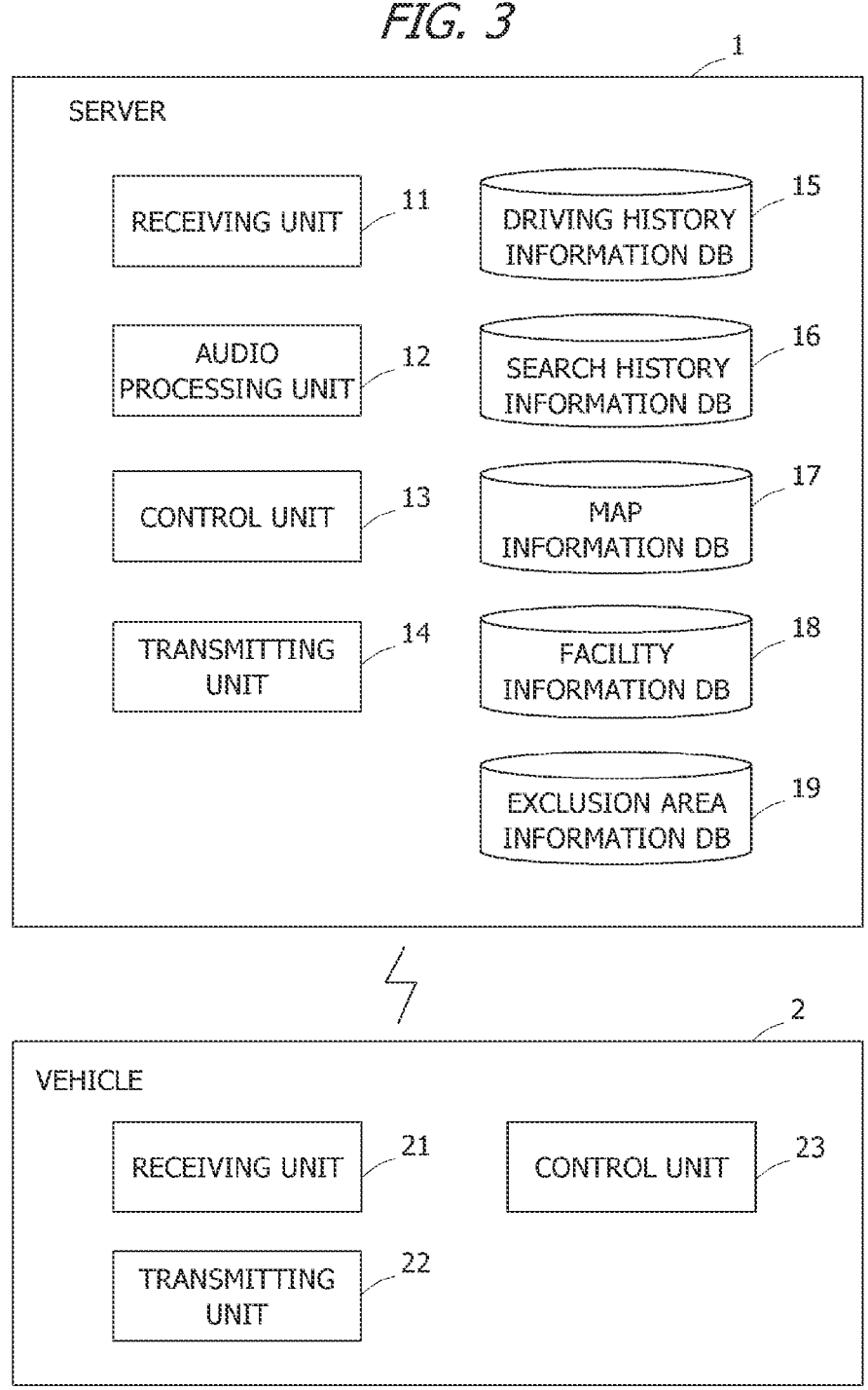
FIG. 3 is a diagram illustrated to an example of the functional configuration of the server and the vehicle.

FIG. 3 is a diagram illustrated to an example of the functional configuration of the server 1 and the vehicle 2. The vehicle 2 includes a receiving unit 21, a transmitting unit 22, and a control unit 23 as functional components. The processing of these functional components is achieved by the CPU 211 of the in-vehicle device 210 executing one or more predetermined programs held in the auxiliary storage device 213.

The receiving unit 21 receives data from the network N1 through the wireless communication unit 214. The receiving unit 21 outputs the received data to the control unit 23. In the first embodiment, the data received by the receiving unit 21 from network N1 includes information about the facility as a result of the search.

The transmitting unit 22 transmits the data inputted from the control unit 23 to the network N1 through the wireless communication unit 214. The data transmitted by the transmission unit 22 to the network N1 includes, addressed to the server 1, driving history information, search history information, and audio data and position information.

For example, the control unit 23 transmits the driving history information to the server 1 through the transmitting unit 22 at a predetermined period. The period for which the driving history information is transmitted may be arbitrarily set, for example, in the range of 0.1 seconds to 10 seconds. The driving history information includes, for example, the position information acquired by the GPS receiver 215, and a time stamp of the time when the position information is acquired. However, the information included in the driving history information is an example, and other information such as speed and direction of travel may also be included.

In addition, the control unit 23 generates the search history information and transmits it to the server 1 through the transmission unit 22 when a search for a facility is performed caused by user operation through the touch panel display 230. The search for a facility by user operation means a search performed when explicit search instructions are entered by the user using, for example, a map application and a browser search engine. In such the search, the facility which is a search target is specified on a map, by keywords or by voice. The search history information includes, for example, time information indicating the time when the search is conducted, and identification information of the facility which is a search target. The identification information of the facility which is a search target may be, for example, the identification information used to identify the facility in the facility search system 100, and the name of the facility. The identification information of the facility which is a search target is acquired, for example, from the map application or browser from which the search is conducted.

In addition, the control unit 23 receives, through the CAN interface 216, the audio data of utterance voice from a user riding in the vehicle 2 that is recorded by the microphone 220. When receiving the audio data, the control unit 23 transmits the position information and the received audio data to the server 1 through the transmitting unit 22. When the utterance content by the user in the ride indicates an instruction to search for a facility, the control unit 23 receives information about the facility from the server 1 through the receiving unit 21. The control unit 23 outputs information about the facility received from the server 1 to the microphone 220 and/or the touch panel display 230. Herein after, transmission or reception from the in-vehicle device 210 is referred to as transmission or reception from the vehicle 2 for convenience.

Next, the server 1 include a receiving unit 11, an audio processing unit 12, a control unit 13, a transmitting unit 14, a driving history information DB 15, a search history information DB 16, a map information DB 17, a facility information DB 18 and an exclusion area information DB 19 as a functional configuration. The processing of these functional components is achieved by the CPU 101 of the server 1 executing one or more predetermined programs held in the auxiliary storage device 103.

The receiving unit 11 receives data from the network N1 through the network interface 104. The receiving unit 11 outputs the data received from the network N1 to the control unit 13. The data received by the receiving unit 11 from the network N1 includes, in the first embodiment, the driving history information, the search history information, and the audio data and the position information from the vehicle 2.

The transmitting unit 14 transmits the data input from the control unit 13 to the network N1 through the network interface 104. The data transmitted by the transmitting unit 14 to the network N1 includes information about the facility as a result of the search addressed to the vehicle 2.

The processing of the speech processing unit 12 is a processing achieved by the CPU 101 executing a speech recognition program held in the auxiliary storage device 103. When the audio processing unit 12 receives input audio data from the control unit 13, the audio processing unit 12 performs speech recognition processing on the input audio data. In the speech recognition processing, audio data is converted to text data, and the syntax analysis is performed on the text data to acquire utterance content. The audio processing unit 12 outputs data indicating utterance content to the control unit 13.

When the control unit 13 receives the input of the driving history information of the vehicle 2 from the receiving unit 11, the control unit 13 stores the driving history information in the driving history DB 15. When the control unit 13 receives the input of the search history information of the vehicle 2 from the receiving unit 11, the control unit 13 stores the search history information in the search history information database 16.

When the control unit 13 receives the input of the utterance content in the audio data of the user of the vehicle 2 from the audio processing unit 12, the control unit 13 determines whether the utterance content in the audio data indicates an instruction to search a facility. For example, the control unit 13 stores a plurality of utterance contents indicating an instruction to search a facility in advance in a predetermined storage area in the auxiliary storage device 103. The utterance contents recorded in advance indicating the instruction to search for a facility includes questions such as "What is that?," "What is it?," "Is there such a thing?," "what is this?," and "What is this?" The control unit 13 compares the utterance content in the audio data of the user with the utterance content that is recorded in advance. When there is a match or similarity between the utterance content in the audio data of the user and the utterance content recorded in advance, the control unit 13 determines that the utterance content in the audio data of the user indicates an instruction for searching a facility.

When the utterance content of the audio data indicates the instruction to search for a facility, the control unit 13 searches for a facility by referring to the map information DB 17 as a predetermined search range based on the position information received from the vehicle 2 together with the audio data. The search range of a facility is, for example, the range within a predetermined distance centered on the position of the vehicle 2, and the range within the predetermined range centered on the point that has advanced a predetermined distance in a predetermined direction from the position of vehicle 2. The shape of the search range is not limited to a circle, but may be fan-shaped, elliptical, or rectangular. Furthermore, the location of the vehicle 2 may not be included in the search range of a facility.

When the vehicle 2 includes a system that detects the direction of the occupant's line of sight, the in-vehicle device 210 may transmit information of the direction of the occupants' line of sight along with the audio data and the position information to the server 1. In this case, the control unit 13 may also search for a facility within a predetermined range in the direction of the occupant's line of sight as the search range.

The control unit 13 determines whether the position information of the vehicle 2 indicates that the vehicle 2 is within the exclusion area. The exclusion area is an area in which the vehicle 2 travels more frequently than a threshold. The areas included in the exclusion areas are recorded in the exclusion area information DB 19 described below. When the position information of the vehicle 2 indicates that the vehicle 2 is within the exclusion area, the control unit 13 selects a new facility from the facilities within the search range as a candidate for the search target. When the position information of the vehicle 2 indicates that the vehicle 2 is outside the exclusion area, the control unit 13 selects a candidate for the search target from facilities within the search range. In this case, the control unit 13 refers to the search history information DB 16 and excludes a facility with the search history by the user of the vehicle 2 from a candidate for the search target. When a plurality of facilities are detected from the search range, for example, a predetermined number of facilities from the top may be selected as candidates based on data such as external search number rankings.

The control unit 13 acquires information about the facility selected as the candidate for the search target from the facility information DB 18. The control unit 13 generates screen data and/or audio data as a search result based on the acquired information about the facility, and transmits it to the vehicle 2 through the transmitting unit 14.

Furthermore, the control unit 13 records and updates the exclusion areas. The details of the process of recording and updating the exclusion areas will be described later.

The driving history information DB 15, the search history information DB 16, the map information DB 17, the facility information DB 18, and the exclusion area information DB 19 are respectively generated in the storage area of the auxiliary storage device 103. The driving history information DB 15 stores the driving history information of the vehicle 2. The search history information DB 16 stores the search history information of the vehicle 2. The driving history information DB 15 and the search history information DB 16 are updated by the control unit 13 each time the driving history information and the search history information are received from the vehicle 2.

The map information DB 17 stores map information. The map information includes, for example, a map plotted with the location of each facility and the identification information of each facility. The map information is divided into zones in advance, and each zone is given a tag indicating its use. The tags given to zones include, for example, commercial zones, urban zones, agricultural zones, and residential zones. The types of tags assigned to each zone are not limited to these.

The facility information DB 18 stores information about each facility on the map. The information about the facility includes the identification information of the facility, the name of the facility, the genre of the facility, the opening date of the facility or the date of the planned opening, a description of the facility, images of the exterior and/or interior of the facility, and the like. The map information DB 17 and the facility information DB 18 may be generated by a predetermined vendor, for example. For example, when update information is issued by the vender, the control unit 13 may update the map information DB 17 and the facility information DB 18 by acquiring the update information from the vender. Note, external databases may be use as the map information DB 17 and the facility information DB 18 instead of the server 1 including the map information DB 17 and the facility information DB 18.

The exclusion area Information DB 19 stores information about the exclusion areas. In the facility search system 100, the scope of service provision is divided into areas. The areas may be geographical ranges independently set in the facility search system 100, or regions divided into regions on the map information may be used. Note, the areas managed in the facility search system 100 may be different in shape and size. Note, in the facility search system 100, the area is set so as not to overlap with other areas.

On the other hand, the exclusion areas may be set independently from the areas managed in the facility search system 100. The ranges of the exclusion areas and the ranges of the areas managed in the facility search system 100 may be overlapped. Also, the exclusion areas may overlap each other. The information about an exclusion area stored in the exclusion area information DB 19 includes, for example, the identification information of the exclusion area and information indicating the range of the exclusion area.

Note that the driving history information DB 15, the search history information DB 16, and the exclusion area information DB 19 are generated for each user registered in the facility search system 100, for example. However, not limited to this, the driving history information DB 15, the search history information DB 16, and the exclusion area information DB 19 may be generated, for example, for each the vehicle 2s registered in the facility search system 100.

Figure 4:
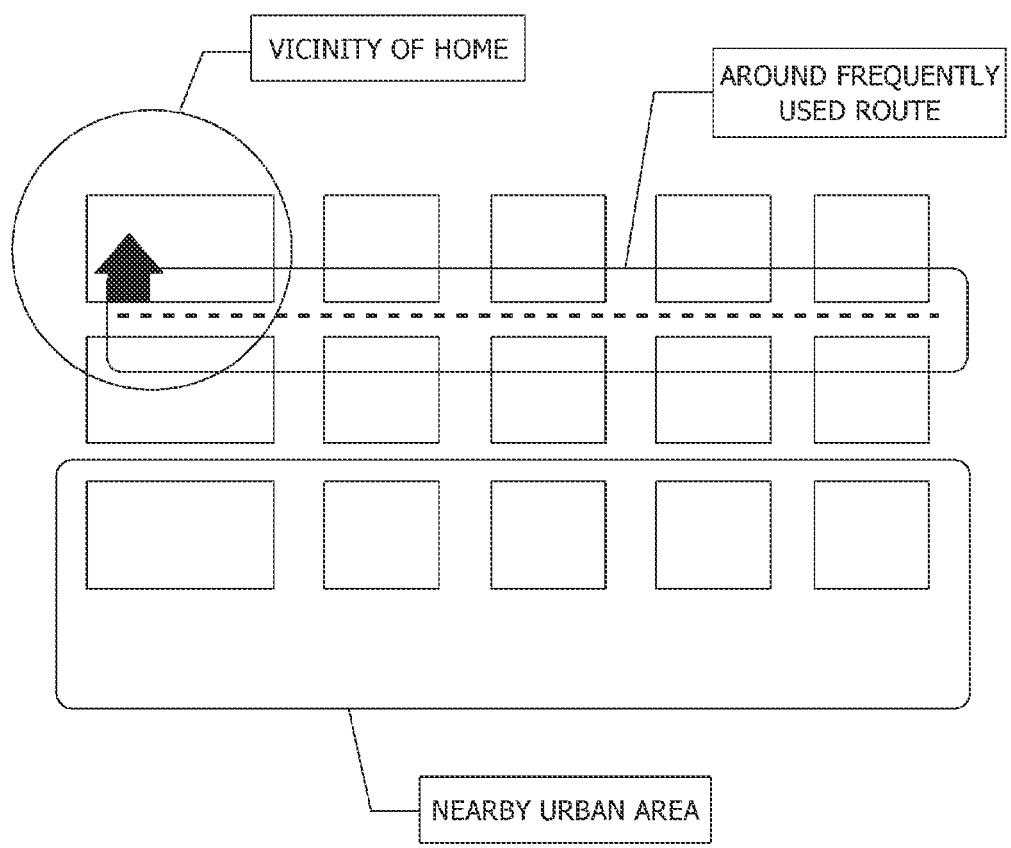
FIG. 4 is a diagram illustrating an example of exclusion areas.

FIG. 4 is a diagram illustrating an example of exclusion areas. In the first embodiment, a predetermined range including user's home, which is associated with the vehicle 2, and the urban area or commercial area around the user's home are recorded as an exclusion area by default. The predetermined range including the user's home is, for example, a range within a predetermined distance from the user's home. However, the size and shape of the predetermined range including the user's home, are not limited to the predetermined size and shape. The information of the urban area or commercial area is acquired, for example, from the map information DB 17. For example, the urban areas or commercial areas that are registered as exclusion areas are a predetermined number of the urban areas or commercial areas in order of proximity to the user's home. Note, not limited to this, it is possible to record, by default, as an exclusion area, a predetermined range including a point specified by a user corresponding to a vehicle 2 of a workplace, a parent's home, and a store, for example.

Furthermore, the control unit 13 monitors the driving history information of the vehicle 2 and records a predetermined range including the driving position of the vehicle 2 as an exclusion area, when the number of times the vehicle 2 has driven in the most recent predetermined period in the area where the vehicle 2 has traveled is equal to or greater than the predetermined number of times. As a result, the area around the route frequently used by the user of the vehicle 2 will be recorded as an exclusion area. The most recent predetermined period is set arbitrarily, for example, in the range of one month to one year from now. The predetermined range including the driving position of the vehicle 2 that is recorded as the exclusion area may be, for example, the range of a predetermined distance from the driving position of the vehicle 2, or an area including the driving position of the vehicle 2.

The driving history information of vehicle 2 is an example of "movement history information of user." The number of times the vehicle 2 has driven in an area in the most recent predetermined period is an example of "visit frequency" to the area. The exclusion area is an example of "a first area where visit frequency of the user is higher than a predetermined threshold."

<Process Flow>

Figure 5:
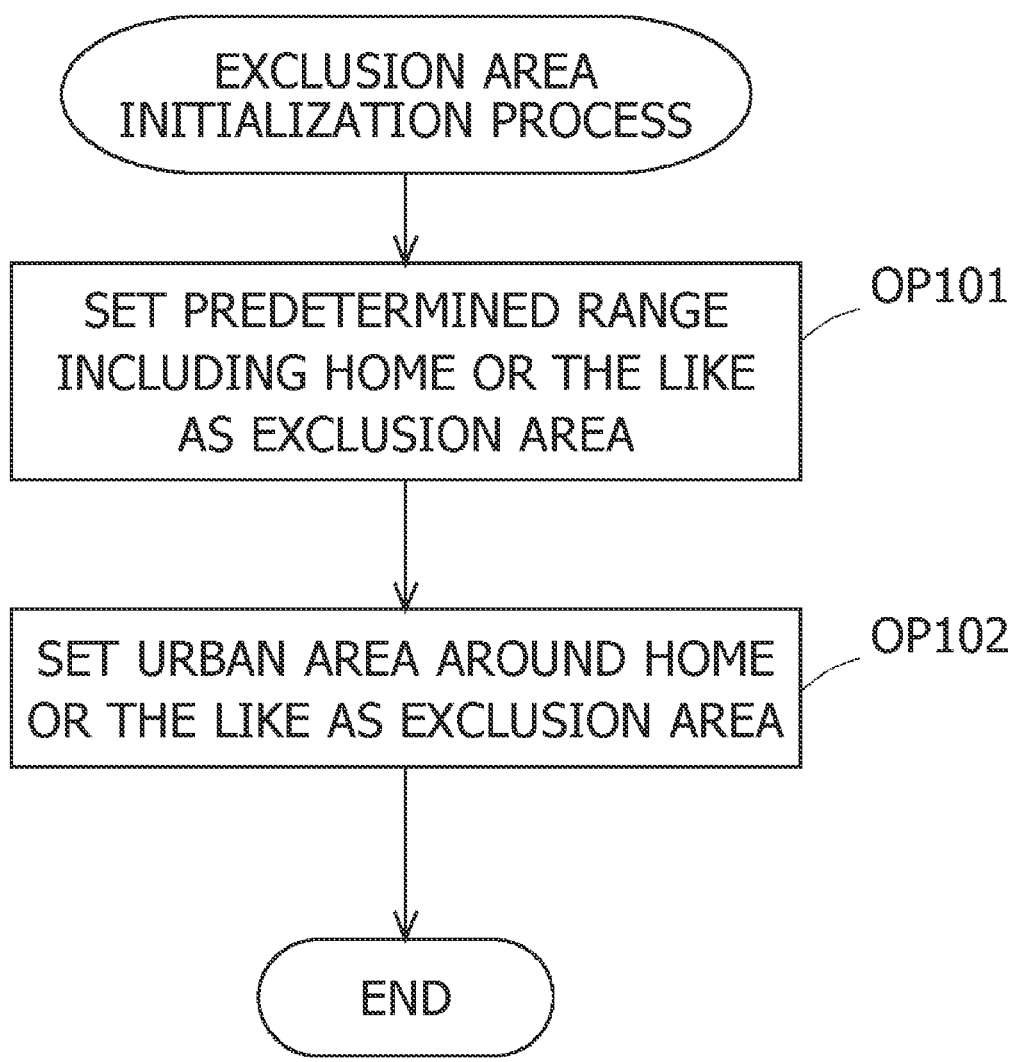
FIG. 5 is an example of a flow chart of exclusion area initialization process executed by the server.

FIG. 5 is an example of a flow chart of exclusion area initialization process executed by the server 1. The process illustrated in FIG. 5 starts, for example, when the user registers as a user in the facility search system 100, and, when the address to be registered as an exclusion area is changed, added, or deleted by the user associated with the vehicle 2. Note, user registration, as well as change, addition, and deletion of the address to be registered in the exclusion area, are performed through the in-vehicle device 210 or a user terminal such as a smartphone. Although the CPU 101 of the server 1 is the main executing entity of the process illustrated in FIG. 5, for convenience, the functional components are explained as the main entity. The same applies to the flow chart in FIG. 5 and onwards.

In the OP101, the control unit 13 sets a predetermined range, as an exclusion area, including a specified address such as a home and records information about the predetermined area as information about the exclusion area in the exclusion area information DB 19. In the OP102, the control unit 13 sets the urban area or commercial area around the specified address such as a home as an exclusion area by referring to the map information DB 17 and records information about the urban area or commercial area as information about the exclusion area in the exclusion area information DB 19. Then, the process illustrated in FIG. 5 ends.

FIG. 6 is an example of a flow chart of exclusion area management process executed by the server 1. The process illustrated in FIG. 6 is repeated at a predetermined interval. In the OP201, the control unit 13 determines whether or not the driving history information is received from the vehicle 2. When the driving history information is received from the vehicle 2 (OP201: YES), the process proceeds to OP202. When the driving history information is not received from the vehicle 2 (OP201: NO), the process illustrated in FIG. 6 ends.

In the OP202, the control unit 13 determines whether the driving area of the vehicle 2 has changed based on the position information included in the driving history information received in the OP201 and the position information included in one previous driving history information. The driving area is the area in which the vehicle 2 is driving, i.e. the area where the vehicle 2 is currently located. When the driving area of the vehicle 2 changes (OP202: YES), the process proceeds to OP203. When the driving area of the vehicle 2 has not changed (OP202: NO), the process illustrated in FIG. 6 ends.

In the OP203, the control unit 13 acquires the number of times the vehicle 2 has driven in the driving area in the most recent predetermined period by referring to the driving history information DB 15. In the OP204, the control unit 13 determines whether the number of times the vehicle 2 has driven in the driving area in the most recent predetermined period is equal to or greater than a threshold. When the number of times the vehicle 2 has driven in the driving area in the most recent predetermined period is equal to or greater than the threshold (OP204: YES), the process proceeds to OP205.

In the OP205, the control unit 13 refers to the exclusion area information DB 19 to determine whether the position information included in the driving history information received in the OP201, that is, the driving position of the vehicle 2, is included in the exclusion area. When the driving position of the vehicle 2 is included in the exclusion area (OP205: YES), the process illustrated in FIG. 6 ends. When the driving position of vehicle 2 is not included in the exclusion area (OP205: NO), the process proceeds to OP206. In the OP206, the control unit 13 puts a predetermined area including the driving position of the vehicle 2 as an exclusion area to add information about the predetermined range to the exclusion area information DB 19, for example. Then, the process illustrated in FIG. 6 ends.

When the number of times the vehicle 2 has driven in the driving area in the most recent predetermined period is less than the threshold (OP204: NO), the process proceeds to OP207. In the OP207, the control unit 13 determines whether the driving position of the vehicle 2 is included in the exclusion area, for example, by referring to the exclusion area information DB 19. When the driving position of the vehicle 2 is not included in the exclusion area (OP207: NO), the process illustrated in FIG. 6 ends.

When the driving position of the vehicle 2 is included in the exclusion area (OP207: YES), the process proceeds to OP208. In the OP208, the control unit 13 deletes, for example, information about the exclusion area including the driving position of the vehicle 2 from the exclusion area information DB 19. As a result, the predetermined area including the driving position of the vehicle 2 is removed from the exclusion areas. Then, the process illustrated in FIG. 6 ends. Note, when a plurality of pieces of information about the exclusion area including the driving position of the vehicle 2 are stored in the exclusion area information DB 19, for example, the control unit 13 may delete all of the plurality of the pieces of the information about the exclusion area.

FIG. 7 is an example of a flow chart of a facility search process executed by the server 1. The process illustrated in FIG. 7 is repeated at a predetermined interval.

In the OP301, the control unit 13 determines whether or not audio data and position information are received from the vehicle 2. When both the audio data and the position information are received from vehicle 2 (OP301: YES), the process proceeds to OP302. When the audio data and the position information are not received from the vehicle 2 (OP301: NO), the process illustrated in FIG. 7 ends.

In the OP302, the control unit 13 instructs the speech recognition processing of the received audio data to the audio processing unit 12, and acquires the utterance content of the audio data from the vehicle 2. In the OP303, the control unit 13 determines whether the utterance content of the audio data indicates an instruction to search a facility. When the utterance content of the audio data indicates the instruction to search for a facility (OP303: YES), the process proceeds to OP304. When the utterance content of the audio data does not indicate the instruction to search for a facility (OP303: NO), the process illustrated in FIG. 7 ends.

In the OP304, the control unit 13 searches for facilities within a predetermined range from the position indicated by the position information of the vehicle 2 by referring to the map information DB 17. In the OP305, the control unit 13 determines whether the position information of the vehicle 2 indicates that the vehicle 2 is within any of the exclusion areas by indicating to the exclusion area information DB 19. When the position information of the vehicle 2 indicates that the vehicle 2 is within any of the exclusion areas (OP305: YES), the process proceeds to OP306. When the position information of the vehicle 2 does not indicate that the vehicle 2 is within any of the exclusion areas (OP305: NO), the process proceeds to OP307.

In OP306, the control unit 13 refers to the facility information DB 18 to extract a new facility from among a plurality of facilities detected as a result of the search in OP304. A new facility, for example, is one that is included in the predetermined time period immediately before the opening date. In the OP307, the control unit 13 refers to the search history information DB 16 to exclude facilities with search history from the plurality of facilities searched as search results.

In the OP308, the control unit 13 selects a facility which is a candidate for a search target from one or more facilities that are detected as a result of the search and that are left over from the process in the OP306 and OP307. As the facilities which are candidates for the search target, for example, a predetermined number of facilities from top of the search ranking or predetermined number of facilities from top in order of proximity or distance from the positions indicated by the position information of the vehicle 2 may be selected. When no facilities remain as a result of the search in the processing in OP306 and OP307, it is no longer applicable, and the control unit 13 may send a response to the vehicle 2 indicating no application.

In the OP 309, the control unit 13 acquires information about one or more candidate facilities from the facility information DB 18, generates screen data or/and audio data corresponding to the information about the one or more candidate facilities, and transmits it to the vehicle 2. After that, the process illustrated in FIG. 7 ends.

Note that the processing of the server 1 illustrated in FIG. 5 to FIG. 7 is an example, and is not limited to the processing illustrated in FIG. 7 For example, in the facility search process illustrated in FIG. 7, a determination whether the vehicle 2 is within the exclusion area in OP305 may be performed before the processing of searching for a facility in OP304. In this case, when the vehicle 2 is within the exclusion area, the control unit 13 searches for a new facility in the vicinity, and when the vehicle 2 is outside the exclusion area, the control unit 13 searches for a facility in the vicinity. Also, after the process of sending information about the candidate facility to the vehicle 2 in OP309 in FIG. 7, the vehicle 2 may receive feedback on whether the candidate facility is the search target, and based on the result, generate search history information and record it in the search history information DB 16.

<Operations and Effects of the First Embodiment>

In the first embodiment, when an instruction to search for a facility by the user of the vehicle 2 is detected and the vehicle 2 is located within an exclusion area, information about a new facility around the vehicle 2 is presented to the vehicle 2. The exclusion area is the area where the vehicle 2 frequently drives. In the exclusion area, by limiting facilities which are candidates for the search target by the user of vehicle 2 to new facilities, it is possible to accurately hit the facility which is the search target by the user of the vehicle 2. In addition, since it is possible to reduce the possibility that information about facilities other than the facilities which are the search target by the user of the vehicle 2 is presented, the inconvenience caused to the user by presenting unwanted information can be reduced.

In the first embodiment, the exclusion areas are updated from time to time based on the driving history information of the vehicle 2. Therefore, even if there is a change in the behavior trend of the user of the vehicle 2 and the area where the vehicle 2 frequently travels changes, the exclusion areas can also be changed according to the change.

<Other Variations>

The above embodiment is only an example, and the present disclosure may be implemented with appropriate changes within the scope of not deviating from its gist.

In the first embodiment, it is explained that the user uses the in-vehicle device installed in the vehicle, but in the facility search system 100 according to the first embodiment, other devices can be adopted instead of the in-vehicle device. For example, in the facility search system 100, a user terminal such as a smartphone may be adopted instead of the in-vehicle device. In this case, the user terminal transmits the movement history information including the position information and the time information of the time when the position information is acquired to the server 1 at a predetermined period. In addition, the user terminal transmits the user's audio data and the position information to the server 1, and the server 1 searches for facilities within a predetermined range based on the position information of the user terminal, as in the first embodiment, based on the audio data and the position information. In the facility search system 100, in addition to a smartphone, there are other user terminals that can be used instead of the in-vehicle device, such as a tablet terminal, a PC, and a wearable terminal.

In the first embodiment, the server 1 executes the processing of FIGS. 5 to 7, but is not limited to this. The functional configuration of the server 1 may be transferred to a terminal device such as an in-vehicle device and a user terminal, and the terminal device may execute the processing of FIGS. 5 to 7. In addition, speech recognition processing may be executed on the terminal device side.

The processes and structure described in the present disclosure may be freely combined to the extent that no technical conflict exists.

A process which is described to be performed by one device may be performed among a plurality of devices.

Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising
a storage that holds search history information indicating history of a search for a facility by a user; and
a processor configured to:
detect, when position information of the user indicates that the user is in a first area where visit frequency of the user is higher than a predetermined threshold, one or more first facilities which are one or more new facilities built within a preceding predetermined time period by searching within a predetermined range based on the position information;
detect, when the position information indicates that the user is outside the first area, second facilities including one or more new facilities and one or more facilities other than the one or more new facilities by searching within the predetermined range based on the position information;
obtain one or more third facilities by excluding one or more facilities for which the search history information indicates that there is a search history from the one or more first facilities or the second facilities; and
output information about the one or more third facilities to a predetermined device.

2. The information processing apparatus according to claim 1, wherein the processor configured to determine, when detecting an instruction from the user to search for a facility, whether the position information indicates that the user is in the first area.

3. The information processing apparatus according to claim 2, wherein
the processor is configured to:
acquire audio data of utterance by the user; and
detect, by analyzing the audio data, the instruction from the user to search for a facility.

4. The information processing apparatus according to claim 3, wherein the processor is configured to receive the audio data of the utterance by the user and the position information from a user terminal of the user.

5. The information processing apparatus according to claim 1, wherein the processor is further configured to:
acquire movement history information indicating movement history of the user; and
record, as the first area, an area where the visit frequency indicated by the movement history information of the user is equal to or greater than the predetermined threshold.

6. The information processing apparatus according to claim 5, wherein the processor is configured to:
monitor the movement history information of the user;
add, to the first area, areas where the visit frequency in most recent predetermined period has changed to equal to or greater than the predetermined threshold; and
remove, from the first area, areas where the visit frequency in the most recent predetermined period has changed to less than the predetermined threshold.

7. The information processing apparatus according to claim 5, wherein
the processor is configured to record, as the first area, the area including home of the user and an urban area around the home of the user.

8. A method executed by a computer comprising
storing search history information indicating a history of a search for a facility by a user;
detecting, when position information of the user indicates that the user is in a first area where visit frequency of the user is higher than a predetermined threshold, one or more first facilities which are one or more new facilities built within a preceding predetermined time period by searching within a predetermined range based on the position information;
detecting, when the position information indicates that the user is outside the first area, second facilities including one or more new facilities and one or more facilities other than the one or more new facilities by searching within the predetermined range based on the position information;
obtaining one or more third facilities excluding one or more facilities for which the search history information indicates that there is a search history from one or more first facilities or the second facilities; and
outputting information about the one or more third facilities to a predetermined device.

9. The method according to claim 8, wherein
the computer executes determining, when detecting an instruction from the user to search for a facility, whether the position information indicates that the user is in the first area.

10. The method according to claim 9, wherein
the computer executes:
acquiring audio data of utterance by the user; and
detecting, by analyzing the audio data, the instruction from the user to search for a facility.

11. The method according to claim 10, wherein
the computer executes receiving the audio data of the utterance by the user and the position information from a user terminal of the user.

12. The method according to claim 8, wherein
the computer further executes:
acquiring movement history information indicating movement history of the user; and
recording, as the first area, an area where the visit frequency indicated by the movement history information of the user is equal to or greater than the predetermined threshold.

13. The method according to claim 12, wherein
the computer executes:
monitoring the movement history information of the user;
add, to the first area, areas where the visit frequency in most recent predetermined period has changed to equal to or greater than the predetermined threshold; and
removing, from the first area, areas where the visit frequency in the most recent predetermined period has changed to less than the predetermined threshold.

14. The method according to claim 12, wherein the computer executes recording, as the first area, the area including home of the user and an urban area around the home of the user.

* * * * *